United States Patent [19]
Allen et al.

[11] 3,850,243
[45] Nov. 26, 1974

[54] VERTICAL DOWNWARD GAS-DRIVEN MISCIBLE BLANKET FLOODING OIL RECOVERY PROCESS

[75] Inventors: Joseph C. Allen, Bellaire; Jack F. Tate, Houston, both of Tex.

[73] Assignee: Texaco Inc., New York, N.Y.

[22] Filed: May 4, 1973

[21] Appl. No.: 357,417

[52] U.S. Cl. .................... 166/267, 166/274
[51] Int. Cl. ............................ E21b 43/16
[58] Field of Search .......... 166/266, 267, 273, 274, 166/275

[56] References Cited
UNITED STATES PATENTS

| | | | |
|---|---|---|---|
| 2,708,481 | 5/1955 | Allen | 166/268 |
| 2,842,204 | 7/1958 | Horner | 166/268 |
| 3,003,554 | 10/1961 | Craig, Jr. et al. | 166/274 |
| 3,131,760 | 5/1964 | Arendt et al. | 166/268 |
| 3,157,231 | 11/1964 | Darley | 166/268 |
| 3,241,614 | 3/1966 | Bertness | 166/304 |
| 3,249,157 | 5/1966 | Brigham et al. | 166/273 |
| 3,729,053 | 4/1973 | Froning | 166/273 |

*Primary Examiner*—James A. Leppink
*Attorney, Agent, or Firm*—T. H. Whaley; C. G. Ries

[57] ABSTRACT

A vertical downward gas-driven miscible blanket oil recovery process wherein the spreading rate of the solvent blanket on top of the oil column is increased by adding to the conventional solvent a high density solvent such as carbon disulfide, carbon tetrachloride or certain halogenated hydrocarbons. Sufficient dense solvent is added to the conventional hydrocarbon solvent to increase the density of the injected solvent mixture to a value only slightly less than the density of the formation petroleum being displaced, so that a stable blanket will be maintained with substantially increased rate and extent of spreading of the solvent blanket on top of the oil column. The miscible blanket is displaced downward by injecting gas such as natural gas, methane, or carbon dioxide into the upper portion of the reservoir.

17 Claims, 2 Drawing Figures

ABSTRACT# VERTICAL DOWNWARD GAS-DRIVEN MISCIBLE BLANKET FLOODING OIL RECOVERY PROCESS

BACKGROUND OF THE INVENTION

1. Field of the Invention

This invention pertains to miscible flooding oil recovery process and particularly to an improved oil recovery process utilizing the vertical downward moving miscible blanket flooding technique, and more particularly to a method for increasing the rate and degree of spreading of the solvent slug or blanket on top of the oil column.

2. Description of the Prior Art

Petroleum is found in subterranean formations or reservoirs in which it has accumulated, and recovery is initially accomplished by pumping or permitting the petroleum to flow to the surface of the earth through wells drilled into the subterranean formation for that purpose. Petroleum can be recovered from subterranean formations only if certain conditions are satisfied. For example, there must be an adequately high concentration of petroleum in the formation, and there must be sufficient permeability and porosity or interconnected flow channels throughout the formation to permit the flow of fluids therethrough if sufficient pressure is applied to the fluids. Furthermore, the formation petroleum viscosity must be sufficiently low that it will flow through the flow channels if pressure is applied thereto. When the subterranean petroleum-containing formation has natural energy present in the form of an underlying active water drive, or solution gas, or a high pressure gas cap above the petroleum-saturated zone of the formation, this natural energy is utilized to recover petroleum. This phase of oil recovery is referred to as primary recovery. When this natural energy source is depleted, or in the instance of those formations which do not originally contain sufficient natural energy to support primary recovery operations, some form of supplemental recovery process must be used. Supplemental oil recovery is frequently referred to as secondary or tertiary recovery, although in fact it may be primary, secondary, or tertiary in sequence of employment.

Although water flooding or water injection is the simplest and most widely used form of supplemental oil recovery, it is not particularly effective because water does not displace petroleum efficiently. Persons skilled in the art of oil recovery have recognized the inefficiency of water flooding, and it has been proposed in the prior art to inject a solvent for petroleum into the formation to reduce the viscosity of the naturally occurring petroleum, followed by injection of a drive fluid such as water or natural gas, in order to recover a higher percentage of the formation petroleum than is possible utilizing water or gas alone.

One particular type of miscible flooding is referred to as vertically downward moving miscible blanket flooding. This type of oil recovery is especially suitable for use in very thick reservoirs, e.g., petroleum reservoirs having a thickness in excess of 50 feet or more. In miscible blanket flooding, a solvent, e.g., a material which is miscible under reservoir conditions with formation petroleum is injected into the upper portions of the petroleum reservoir. After a predetermined pore volume of solvent is injected, a drive gas such as lean gas is injected into the upper portions of the formation in order to displace the slug or blanket or solvent vertically downward. The idealized version of downward miscible blanket flooding contemplates the formation of a discrete, relatively thin layer of solvent which has spread completely across the top of the oil column from which oil recovery is sought, with the miscible slug or blanket being displaced downward in the substantially piston-like manner by the subsequently injected dry gas. Oil production will normally be taken by a well or wells completed in the bottom of the petroleum-containing formation. Initially only petroleum will be recovered, and after a substantial amount of time has elapsed a mixture of the previously injected solvent slug and petroleum will be recovered from the formation. Since the upper portion of the oil column has a reduced viscosity as a result of the presence of the miscible blanket therein, much more efficient displacement of petroleum from the formation is achieved than would be possible utilizing lean gas alone.

If the miscible blanket fails to spread over all of the petroleum-saturated zone, only a portion of the reservoir will be subjected to miscible blanket flooding, and the portion not covered by the spreading miscible blanket wll be subjected only to downward displacement by lean gas. Gas displacement is relatively inefficient, so a portion of the reservoir over which the miscible blanket has not spread will experience much lower recovery efficiency than is achieved in the portion of the reservoir which has been covered by the miscible blanket. Accordingly, the anticipated high recovery efficiency of vertically downward miscible blanket flooding is achieved only if the injected solvent blanket spreads at a sufficiently high rate that it covers the top of the oil column completely. Frequently the injected solvent slug spreads too slowly to cover the entire oil column, especially if there is a substantial difference in density between the injected solvent slug and the formation petroleum, and little difference in density between the solvent and displacing gas.

In view of the foregoing discussion, it can be appreciated that the total oil recovery efficiency will be reduced dramatically in applications of vertical downward moving miscible blanket flooding if complete spreading of th injected solvent blanket does not occur because of slow spreading rate. Accordingly, there is a substantial need for a method for improving the spreading rate of an injected solvent blanket over the top of the petroleum-saturated formation being subjected to miscible blanket flooding.

Still another problem is sometimes encountered in miscible blanket flooding. In application of this technique the formations containing appreciable quantities of asphaltic or bituminous materials, complete miscibility between the injected solvent and the formation petroleum may not be achieved. This is particularly true since the nature of the solvent is frequently influenced by the types of solvent materials available in the area at a modest cost. Mixtures of $C_1$ to $C_6$ aliphatic hydrocarbons, for example, sometimes are utilized as the miscible blanket, and saturated hydrocarbons such as these are not suitable solvents for asphaltic materials. Accordingly, there is also a substantial, unfulfilled need for an improved miscible blanket flooding technique which will achieve efficient recovery of high asphalt-content petroleum.

SUMMARY OF THE INVENTION

We have discovered, and this constitutes our invention, that a vertical downward miscible blanket flooding oil recovery process may be performed under conditions which result in an increase in the spreading rate of the injected solvent, so that the solvent spreads more completely over a greater portion of the oil column. We have also discovered that in certain embodiments of our invention, the effectiveness of the solvent in formations containing petroleum having substantial asphaltic or bituminous content can be increased. The improvement which constitutes our invention involves using a conventional solvent having added thereto a high density solvent such as carbon disulfide or certain halogenated hydrocarbons which are essentially insoluble in and unreactive with water, or carbon tetrachloride. Sufficient dense solvent is added to the conventional solvent to bring the solvent mixture density to a value only slightly less than the density of the formation petroleum. The solvent blanket is displaced vertically downward by injecting a drive gas such as natural gas or carbon dioxide into the upper part of the reservoir. Our invention therefore incorporates the novel solvent mixture for miscible blanket flooding and the method of using this solvent mixture in a vertically downward miscible blanket flood.

DESCRIPTION OF THE PREFERRED EMBODIMENTS

I. The Process

Figure 1:
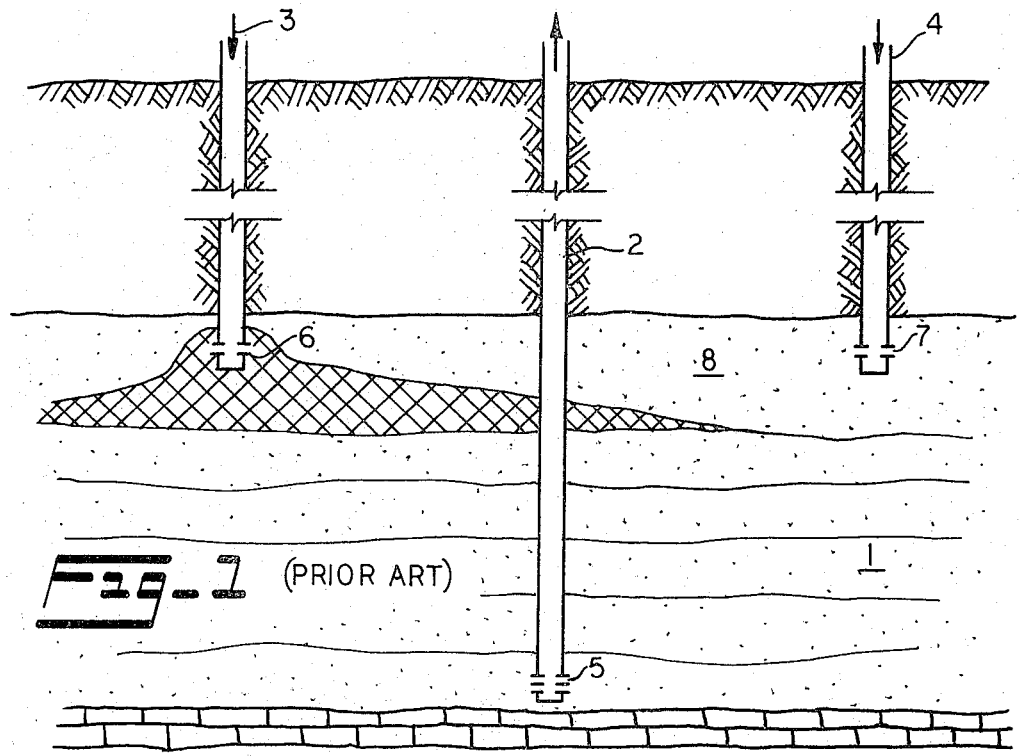
FIG. 1 is an illustrative embodiment of a prior art conventional vertically downward miscible blanket flood oil recovery process.

Our invention may best be understood by referring to the attached drawings. In FIG. 1 there is illustrated a vertically downward miscible blanket oil recovery process as is taught by the prior art, with oil-saturated zone 1 being penetrated by production well 2, solvent injection well 3, and gas injection well 4. Production well 2 has perforations 5 very near the bottom of the petroleum-saturated zone, and the solvent injection well 3 has perforations 6 near the upper portion of the petroleum formation. Gas injection well 4 similarly has perforation 7 high in the oil formation. In the practice of vertically downward miscible blanket flooding, a quantity of solvent, generally in the range of from about 1 pore volume percent to about 20 pore volume percent, is injected into the formation near the upper portion of the petroleum-saturated zone via solvent injection well 3. The solvent moves downward because its density is greater than the gas contained in gas saturated zone 8, to form a relatively thin, discrete layer immediately above the petroleum-saturated zone. The rate at which the injected solvent slug spreads on top of the oil saturated zone is principally determined by the viscosity of the solvent and difference in density between the solvent and the gas in gas saturated zone 8.

Solvents utilized for this type of flooding operation are generally low molecular weight aliphatic hydrocarbons such as ethane, propane, butane, pentane, etc., and various mixtures thereof including LPG or liquefied petroleum gas. The concentrations of the various components in a conventional solvent mixture are non-critical, so long as the cricondenbar (i.e., the pressure above which the solvent components will all be completely miscible with the formation petroleum at formation temperature) is well above the formation pressure, so that complete miscibility between the solvent and formation petroleum is achieved.

Operation of a vertically downward miscible blanket flood under conditions so that displacement will be essentially piston like, i.e., no viscous fingering will result, requires careful manipulation of certain controllable parameters. A vertically downward displacement will generally be piston like provided the density of the displacing fluid is less than the density of the displaced fluid (the formation petroleum), and further providing that the viscosity of the displacing fluid is greater than the viscosity of the displaced fluid (formation petroleum). Moreover, there is a critical velocity for solvent slug movement above which efficient displacement will not be achieved even if the desirable viscosity and density relationships are present. The critical velocity for any particular recovery system is a function of the formation permeability, formation porosity, and differences in density and viscosity between the displacing fluid and displaced fluid.

From the foregoing, it may appear that there are conflicting criteria for the density of the displacing fluid. In order to achieve rapid spreading of the injected solvent slug so as to form a discrete solvent blanket completely covering the top of the oil column, it is desirable to maximize the solvent density. In order to insure piston like displacement without viscous fingering of the injected fluid into the displaced fluid, it is desirable that the density of the injected (displacing) fluid be less than the density of the displaced fluid. We have discovered, however, that it is possible to achieve a significant increase in solvent slug spreading rate without encountering the danger of viscous fingering caused by displacing fluid density being greater than displaced fluid density.

Figure 2:
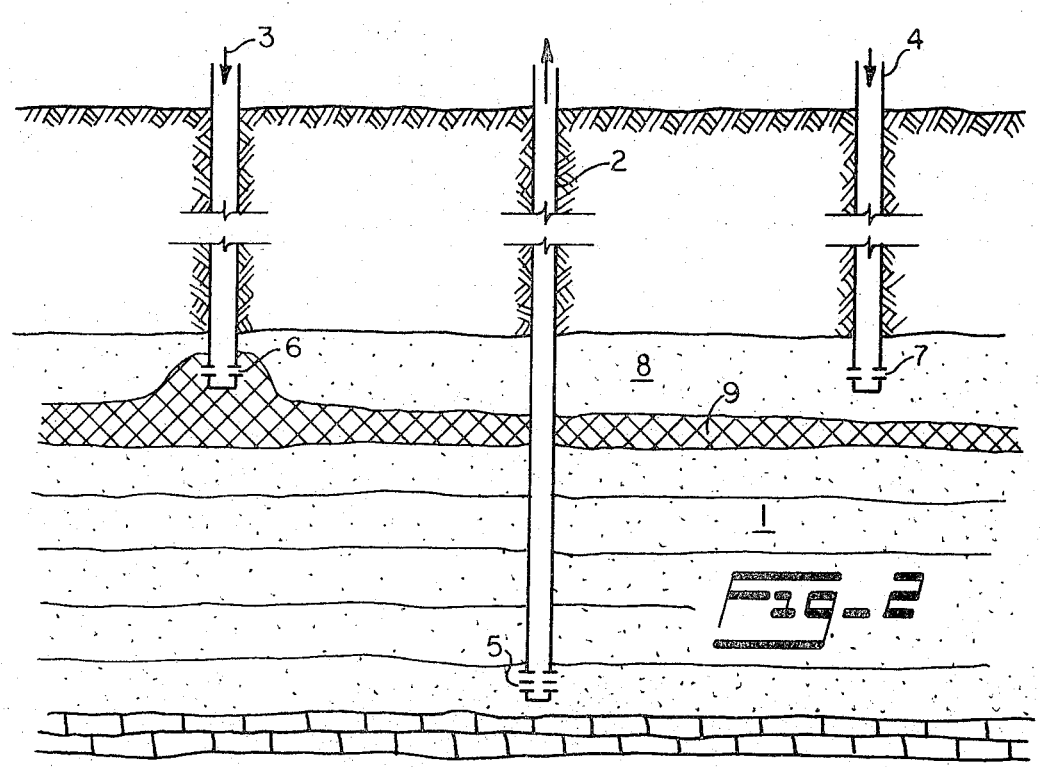
FIG. 2 is an illustrative embodiment of a vertically downward miscible blanket flooding oil recovery process utilizing the mixture of conventional solvent and dense solvent according to our invention with resultant improved solvent slug spreading.

In FIG. 2 there is illustrated a formation being subject to the improved vertically downward miscible blanket flooding procedure according to our invention. As in FIG. 1, the solvent is injected via well 3 and enters the upper portion of the petroleum formation through perforation 6. Gas is injected through well 4 and enters the upper portion of the formation through perforations 7. There is no difficulty in achieving relatively uniform distribution of injected gas throughout the upper portion of the formation because of the high mobility of gas. In this particular instance, the injected solvent 9 comprises a mixture of a conventional hydrocarbon solvent and a dense solvent in a ratio yielding a mixture having a density equal to 90 percent of the density of the formation petroleum. Since the difference in density between solvent and drive-gas is the prime factor in spreading rate, the solvent slug spreads rapidly to form a uniform blanket above the top of the petroleum-saturated zone. Since the density of the injected solvent is still slightly less than the density of the formation petroleum, no viscous fingering is encountered.

II. The Solvent Mixture

The solvent utilized in the process of our invention will be a mixture of a conventional solvent which may itself be a mixture of numerous components, plus a dense solvent such as carbon disulfide or a halogenated hydrocarbon essentially insoluble in and unreactive with water or carbon tetrachloride. Frequently the choice of conventional constituents of the solvent utilized in a miscible flooding operation is determined by logistics and economics more than optimum solvent action. For example, when a need for a miscible flooding operation arises in an area, and it is determined that there is a satisfactory solvent available in the area on an economically attractive basis, this material will be utilized even though it is not necessarily the most effective solvent from a technical point of view. Indeed there is nothing wrong with this criteria since generally any mixture of low molecular weight hydrocarbons will function effectively as a solvent for a miscible blanket flooding operation such as embodied in our invention. Frequently an ethane-propane-butane mixture may be available, and lean gas will be blended with this, adding as much lean gas or methane as is possible to dissolve in the solvent mixture without violating the prime consideration that it remain essentially single phase under conditions of formation temperature and pressure. Inclusion of a small concentration of aromatic hydrocarbon in such a mixture will be beneficial to the efficiency of the process.

The material suitable for use as the dense solvent for increasing the density of the solvent mixture include carbon disulfide, carbon tetrachloride, and certain halogenated hydrocarbons. It can be seen from the handbook data contained in Table I below that a number of materials are satisfactory for use as a density increasing additive for solvents in vertically downward miscible blanket flooding operation.

TABLE I

| Material | Density | Boiling Point, °C. |
| --- | --- | --- |
| Carbon disulfide | 1.263 | 46.3 |
| Trichloro methane (chloroform) | 1.498 | 60.0 |
| Carbon Tetrachloride | 1.595 | 76.8 |
| Chlorobenzene | 1.106 | 132.0 |

Any of the materials listed in Table I are suitable for use in the process of our invention. Furthermore, the boiling points of all of the materials are sufficiently low to permit separation on the surface of solvent from the produced crude by vacuum distillation is feasible. For example, the densities of carbon tetrachloride and carbon disulfide are each substantially greater than the density of formation petroleum, and so either may be mixed with the conventional low molecular weight aliphatic hydrocarbon solvent to be employed in the miscible process of our invention. The quantity of dense solvent to be mixed with the hydrocarbon solvent depends on the density of the formation petroleum and the density of the conventional hydrocarbon solvent and density of the drive fluid. It is a straightforward calculation to determine the amount of dense solvent to be added to the conventional solvent in order to achieve a density substantially greater than the density of the conventional hydrocarbon solvent but slightly less than the density of the formation petroleum. The maximum benefit is achieved by adding sufficient dense solvent to the conventional hydrocarbon solvent to raise the density of the mixture to a value equal to around 80 to 95 percent of the density of the formation petroleum.

The process of our invention may best be understood by reference to the following field example, which is offered only as an illustrative embodiment of our invention and is not intended to be limitative or restrictive thereof.

III. The Drive Fluid

The drive fluid, usually a gas, in conventional vertically downward miscible blanket flooding is generally dry or lean natural gas, e.g., predominantly methane. The same drive gas may be used in our process quite satisfactorily. The growing shortage of natural gas, however, makes the use of some other gas highly desirable. Carbon dioxide is frequently available at an attractive price in oil fields, and carbon dioxide is a particularly desirable gas for use in oil recovery processes since it is highly soluble in petroleum and causes swelling and viscosity reduction of petroleum as a consequence of dissolution therein. However, carbon dioxide is highly compressible and so the density of carbon dioxide at the pressures frequently encountered in petroleum reservoirs will usually exceed the density of conventional solvents. For example, the density of carbon dioxide at 167° F. and 2,100 pounds per square inch pressure is 27.5 pounds per cubic foot, and at 167° F. and 2,500 pounds per square inch pressure, it is 34.4 pounds per cubic foot. The density of a typical solvent composed of $C_2 - C_5$ aliphatic hydrocarbons is 26 pounds per cubic foot. Clearly then a process using such a solvent and carbon dioxide as the drive gas would be doomed to failure. The denser drive gas would not remain above the solvent; mixing between carbon dioxide and the solvent would occur and poor displacement efficiency would result.

Carbon dioxide is a very satisfactory drive gas for use in our process, however, since the density of the solvent can easily be increased to a value greater than the density of carbon dioxide. Another preferred embodiment of our process is therefore the use of a mixture of conventional low molecular weight aliphatic solvent with carbon disulfide, carbon tetrachloride or one of the suitable halogenated hydrocarbons as the solvent and carbon dioxide as the drive gas.

IV. Field Example

A reef type reservoir is located at a depth of 300 feet, and it is determined that it is essentially circular in plan view, 110 feet in thickness and the average diameter is 300 feet. The porosity of the petroleum-containing formation is 30 percent, and so the pore volume of this reservoir is $\pi(300/2)^2 (110)(0.30) = 2,332,630$ cubic feet The production well is drilled to the bottom of the petroleum-saturated interval, and perforations are made near the bottom of said well. A solvent injection well and a gas injection well are drilled into and completed near the top of the petroleum-saturated interval.

It is determined that a material suitable for use as a conventional hydrocarbon solvent is available for an attractive price in the immediate area, said material comprising 25 percent ethane, 40 percent propane, 20 percent butane and 15 percent pentane. Lean gas is also available in the area, and this will be mixed with the solvent to saturation. The lean gas will also be utilized as the displacing or drive gas to be injected in the upper portion of the reservoir for the purpose of displacing the previously injected miscible slug downward.

It is determined that the density of the reservoir petroleum is 44 pounds per cubic foot, and the density of the solvent slug described above is 26 pounds per cubic foot. The density of the displacing gas is 9 pounds per cubic foot. In order to increase the spreading rate of the injected solvent slug, it is necessary to increase the density difference between the solvent and the displacing gas, and yet have a resultant solvent density less than the density of the formation petroleum. This is accomplished most readily by mixing 30 percent by weight carbon disulfide with 70 percent by weight of the above described conventional solvent. This results in a modified solvent mixture having a density of 40 pounds per cubic foot. The difference between density of the solvent and the displacing gas is thereby increased from 17 to 31 pounds per cubic foot, which increases the spreading rate by 82 percent.

In the initial phase of the program, displacing gas and the above-described carbon disulfide-aliphatic hydrocarbon solvent mixture are injected into the formation simultaneously. Gas injection in the initial phase is frequently desirable in order to maintain pressure within the reservoir which helps achieve complete miscibility between the injected solvent and the formation petroleum. It is determined that a 5 pore volume percent slug of solvent will be injected, which amounts to 116,631 cubic feet or 872,516 gallons of the 30 percent carbon disulfide, 70 percent $C_1 - C_5$ aliphatic hydrocarbon solvent mixture. Injection of solvent and gas simultaneously, with gas injection rate being sufficient to maintain the pressure in the formation at 2,000 psi, is continued until all of the solvent mixture has been injected into the formation, which requires 14 years. Solvent injection is thereafter terminated, and dry gas injection is continued for the next 18 years. The previously injected blanket of solvent will retain its discreteness, spread over the entire oil column, and be continually displaced downward through the oil column by the gas being injected above. After 25 years, the solvent blanket is produced with residual formation petroleum dissolved in it. Once it is determined that production of solvent has begun, the produced fluid will be recovered by passing the mixture into a vessel suitably equipped for mixing and heating, with suction from a compressor applied thereto, for separation by distillation. The solvent is condensed for use in another field project. Eventually gas production begins. The production wells will then be recompleted as gas production wells and gas production will be taken from the formation until pressure is depleted. The gas may be re-used in another field or sold as fuel.

Although our invention has been described in terms of several specific illustrative embodiments, many variations thereon will be apparent to persons skilled in the associated arts without departing from the true spirit and scope of our invention. It is accordingly our wish that our invention be limited and restricted only by such limitations and restrictions as appear in the appended claims.

We claim:

1. In a method of recovering petroleum from a subterranean, petroleum-containing formation penetrated by at least one injection well completed high in the formation and by at least one production well completed low in the formation, of the type wherein a quantity of conventional hydrocarbon solvent for petroleum miscible with the petroleum contained in the formation is injected into the top of the formation and thereafter a gaseous drive fluid is injected into the top of the formation to displace the solvent vertically downward through the petroleum formation, the improvement which comprises:

mixing with the conventional hydrocarbon solvent a dense solvent for petroleum having a density greater than the density of the conventional hydrocarbon solvent for petroleum, the mixture of conventional hydrocarbon solvent for petroleum and dense solvent having a resulting density less than the density of the formation petroleum and greater than the density of the conventional hydrocarbon solvent.

2. A method as recited in claim 1 wherein the dense solvent is selected from the group consisting of carbon disulfide, carbon tetrachloride, and halogenated hydrocarbons which are essentially insoluble in and unreactive with water.

3. A method as recited in claim 2 wherein the dense solvent is carbon disulfide.

4. A method as recited in claim 2 wherein the dense solvent is carbon tetrachloride.

5. A method as recited in claim 2 wherein the halogenated hydrocarbon which is essentially insoluble in and unreactive with water is selected from the group consisting of trichloromethane and chlorobenzene.

6. A method as recited in claim 5 wherein the halogenated hydrocarbon is trichloromethane.

7. A method as recited in claim 5 wherein the halogenated hydrocarbon is chlorobenzene.

8. A method as recited in claim 1 wherein the dense solvent is a mixture of carbon disulfide and carbon tetrachloride.

9. A method as recited in claim 1 wherein the solvent also contains an aromatic hydrocarbon solvent.

10. A method as recited in claim 9 wherein the aromatic hydrocarbon is benzene.

11. A method as recited in claim 9 wherein the aromatic hydrocarbon is toluene.

12. A method as recited in claim 1 wherein sufficient dense solvent is added to the conventional solvent to produce a mixture having a density equal to from about 80 to about 95 percent of the density of the formation petroleum.

13. A method as recited in claim 1 wherein the drive fluid is predominantly natural gas.

14. A method as recited in claim 1 wherein the drive fluid is predominantly methane.

15. A method as recited in claim 1 wherein the drive fluid is carbon dioxide.

16. A method as recited in claim 1 wherein a mixture of solvent and formation petroleum is produced near the conclusion of the vertically downward miscible flood and this mixture is subjected on the surface to the additional steps of, a. separating the solvent from the produced mixture of petroleum and solvent by distillation, and b. compressing and reliquefying the solvent.

17. A method for recovering petroleum from a subterranean, petroleum containing formation, said formation being penetrated by at least one production well completed near the bottom of the formation and by at least one injection well completed near the top of the formation, of the type wherein a quantity of hydrocarbon solvent is introduced into the upper portion of the formation, the density of said hydrocarbon solvent being less than the density of the formation petroleum, and thereafter introducing a gaseous drive fluid into the upper portion of the formation to displace the solvent and formation petroleum downward, wherein the improvement comprises:

mixing with said hydrocarbon solvent, a dense solvent for petroleum, said dense solvent having a density greater than the density of the hydrocarbon solvent, in an amount sufficient to produce a mixture of hydrocarbon solvent and dense solvent having a density greater than the density of the hydrocarbon solvent and less than the density of the formation petroleum.

* * * * *